United States Patent
Kong et al.

(10) Patent No.: US 12,294,599 B2
(45) Date of Patent: May 6, 2025

(54) BLOCKCHAIN-BASED HOST SECURITY MONITORING METHOD AND APPARATUS, MEDIUM AND ELECTRONIC DEVICE

(71) Applicant: BEIJING JINGDONG QIANSHI TECHNOLOGY CO., LTD., Beijing (CN)

(72) Inventors: Dezhuang Kong, Beijing (CN); Shihui Nan, Beijing (CN); Yang Wang, Beijing (CN)

(73) Assignee: BEIJING JINGDONG QIANSHI TECHNOLOGY CO., LTD., Beijing (CN)

( * ) Notice: Subject to any disclaimer, the term of this patent is extended or adjusted under 35 U.S.C. 154(b) by 325 days.

(21) Appl. No.: 17/756,258

(22) PCT Filed: Aug. 21, 2020

(86) PCT No.: PCT/CN2020/110562
§ 371 (c)(1),
(2) Date: May 20, 2022

(87) PCT Pub. No.: WO2021/098313
PCT Pub. Date: May 27, 2021

(65) Prior Publication Data
US 2023/0007032 A1    Jan. 5, 2023

(30) Foreign Application Priority Data
Nov. 21, 2019   (CN) .......................... 201911149432.8

(51) Int. Cl.
*H04L 29/00*  (2006.01)
*H04L 9/00*   (2022.01)
*H04L 9/40*   (2022.01)

(52) U.S. Cl.
CPC ............ *H04L 63/1425* (2013.01); *H04L 9/50* (2022.05); *H04L 63/1416* (2013.01)

(58) Field of Classification Search
CPC ... H04L 63/1425; H04L 9/50; H04L 63/1416; H04L 63/1408; H04L 63/1441;
(Continued)

(56) References Cited

U.S. PATENT DOCUMENTS

| 8,850,570 B1* | 9/2014 | Ramzan ................ H04L 63/145 |
| | | 713/188 |
| 2011/0023114 A1* | 1/2011 | Diab .................... G06F 9/4856 |
| | | 709/224 |

(Continued)

FOREIGN PATENT DOCUMENTS

| CN | 105988930 A | 10/2016 |
| CN | 108768883 A | 11/2018 |

(Continued)

OTHER PUBLICATIONS

1st Office Action dated Dec. 28, 2023 for Chinese Application No. 201911149432.8.
(Continued)

*Primary Examiner* — Don G Zhao
(74) *Attorney, Agent, or Firm* — Qinghong Xu

(57) ABSTRACT

The present disclosure relates to a blockchain-based host security monitoring method and apparatus, a computer readable medium and an electronic device. The host security monitoring method in the embodiments of the present disclosure comprises: monitoring traffic data of a host in network communication, and determining whether the traffic data is malicious traffic; if the traffic data is malicious traffic, obtaining security state information of the host, and saving the security state information to a security state blockchain; generating an invasion log corresponding to the malicious
(Continued)

traffic, and saving the invasion log and the security state information to a log storage blockchain.

13 Claims, 11 Drawing Sheets

(58) Field of Classification Search
CPC .... G06F 21/554; G06F 21/566; G06F 21/645; G06F 21/552; G06F 21/577; G06F 16/27; G06F 21/55
See application file for complete search history.

(56) References Cited

U.S. PATENT DOCUMENTS

| | | | |
|---|---|---|---|
| 2013/0227674 A1* | 8/2013 | Anderson | H04L 63/1441 726/15 |
| 2014/0165203 A1* | 6/2014 | Friedrichs | G06F 21/552 726/24 |
| 2016/0337397 A1* | 11/2016 | Li | H04L 67/02 |
| 2017/0195310 A1* | 7/2017 | Tyler | H04L 63/083 |
| 2019/0116038 A1* | 4/2019 | Sprague | H04L 9/3226 |
| 2019/0132350 A1* | 5/2019 | Smith | G06F 21/60 |
| 2019/0132352 A1* | 5/2019 | Zhang | H04L 63/1483 |
| 2019/0163887 A1* | 5/2019 | Frederick | H04L 9/3239 |
| 2019/0166133 A1* | 5/2019 | Frederick | G06F 21/44 |
| 2019/0222586 A1* | 7/2019 | Sachkov | H04L 63/1416 |
| 2020/0137110 A1* | 4/2020 | Tyler | H04L 63/1483 |
| 2020/0250177 A1* | 8/2020 | Padmanabhan | G06F 16/214 |
| 2020/0252803 A1* | 8/2020 | Shah | G06N 20/20 |
| 2020/0267187 A1* | 8/2020 | Singh | G06F 21/57 |
| 2020/0311646 A1* | 10/2020 | Koenig | H04L 9/3297 |
| 2020/0351074 A1* | 11/2020 | Wood | H04L 9/0861 |
| 2024/0144248 A1* | 5/2024 | Barbar | G06Q 30/0201 |

FOREIGN PATENT DOCUMENTS

| | | | |
|---|---|---|---|
| CN | 109743311 A | * | 5/2019 |
| CN | 110084069 A | | 8/2019 |
| CN | 110113328 A | | 8/2019 |
| WO | 2013125055 A1 | | 8/2013 |

OTHER PUBLICATIONS

International Search Report dated Nov. 26, 2020 for PCT International Application No. PCT/CN2020/110562.

* cited by examiner

BLOCKCHAIN-BASED HOST SECURITY MONITORING METHOD AND APPARATUS, MEDIUM AND ELECTRONIC DEVICE

CROSS-REFERENCES TO RELATED APPLICATION

The present application is a 35 U.S.C. 371 national phase application of PCT International Application No. PCT/CN2020/110562 filed on Aug. 21, 2020, which claims the priority of the Chinese patent application filed on Nov. 21, 2019, with the application number of 201911149432.8 and titled by "Blockchain-based Host Security Monitoring Method, Apparatus, Medium and Electronic Device", the entire disclosures of both are incorporated herein by reference.

TECHNICAL FIELD

The present disclosure relates to the field of computer technology, and in particular to a blockchain-based host security monitoring method, a blockchain-based host security monitoring apparatus, a computer readable medium and an electronic device.

BACKGROUND

With the continuous development of computer and Internet technology, they are also constantly suffering from cyber attacks. This has varying degrees of impact on their business, assets, image, etc., Network security issues are getting more and more attention. Moreover, in recent years, cyber attacks have shown a state from individual combat to teamwork, from focusing on system vulnerabilities to focusing on business vulnerabilities. Therefore, large enterprise organizations are facing more sophisticated Advanced Persistent Threat (APT).

Discovering attack behaviors, restoring attack paths, determining the scope of attack, and attacking forensics have become the top concerns of enterprises when they are subjected to security attacks. However, in the current largescale organization, the internal network topology of the enterprise is complex, and the security intrusion detection devices are mainly distributed at various network nodes and edges. Although the attack may be found, it is impossible to determine whether the attacker successfully compromised the target host, and whether the attack is successful with the help of concealment channel causing a greater impact. Thus, the network security device has detection blind spots. In addition, attackers may delete log records after compromising the host, which will have a certain impact on the vulnerability investigation. Therefore, how to perform host security monitoring accurately and credibly is a problem that needs to be solved urgently.

It should be noted that the information disclosed in the background art section above is only used to enhance the understanding of the background of the present disclosure, and therefore may include information that does not constitute the prior art known to those of ordinary skill in the art.

SUMMARY

According to an aspect of the present disclosure, a blockchain-based host security monitoring method is provided. The method includes: monitoring traffic data of a host in a network communication, and determining whether the traffic data is malicious traffic; in response that the traffic data is malicious traffic, obtaining security state information of the host, and saving the security state information into a security state blockchain; and generating an intrusion log corresponding to the malicious traffic, and saving the intrusion log and the security state information into a log storage blockchain.

The present disclosure also discloses a blockchain-based host security monitoring apparatus. The apparatus includes: a traffic data monitoring unit, configured to monitor traffic data of a host in a network communication, and determine whether the traffic data is malicious traffic; an security state saving unit, configured to obtain security state information of the host and save the security state information into the security state blockchain in response that the traffic data is determined to be the malicious traffic; and a log storage unit, configured to generate an intrusion log corresponding to the malicious traffic, and save the intrusion log and the security state information into the log storage blockchain.

The present disclosure also discloses an electronic device, including: one or more processors; and one or more machine-readable media on which instructions are stored. When executed by the one or more processors, the electronic device performs the following steps of: monitoring traffic data of a host in a network communication, and determining whether the traffic data is malicious traffic; in response that the traffic data is malicious traffic, obtaining security state information of the host, and saving the security state information into the security state blockchain; and generating an intrusion log corresponding to the malicious traffic, and saving the intrusion log and the security state information into the log storage blockchain.

The present disclosure also discloses one or more machine-readable media on which instructions are stored. When executed by one or more processors, the processor executes the following steps of: monitoring traffic data of a host in a network communication, and determining whether the traffic data is malicious traffic; in response that the traffic data is malicious traffic, obtaining security state information of the host, and saving the security state information into the security state blockchain; and generating a intrusion log of the malicious traffic, and saving the intrusion log and the security state information into the log storage blockchain.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments that conform to the application, and are used together with the specification to explain the principle of the present disclosure. Obviously, the drawings in the following description are only some embodiments of the application. For those of ordinary skill in the art, other embodiments may be obtained based on these drawings without creative work. In the attached drawings.

DETAILED DESCRIPTION

In order to make the above objectives, features and advantages of the present disclosure more obvious and understandable, the present disclosure will be further described in detail below in conjunction with the accompanying drawings and specific embodiments.

In the related technology of the present disclosure, the security state of a host may be monitored in two ways including traffic analysis or local scanning.

The traffic analysis method is to deploy an intrusion detection system on a bypass of the main network, so as to analyze a data packet in the network and match it with the predefined attack success feature. If the data packet matches the feature, it is determined that the target host is invaded and the attack is recorded into a log and an alarm is provided.

The local scanning method is to install the client detection application on the host, and scan the client regularly based on custom rules. When the host is found to have file abnormalities, user abnormalities, log abnormalities, network abnormalities, process abnormalities, etc., an alarm is reported, and the reported logs are stored in the background.

Figure 1:
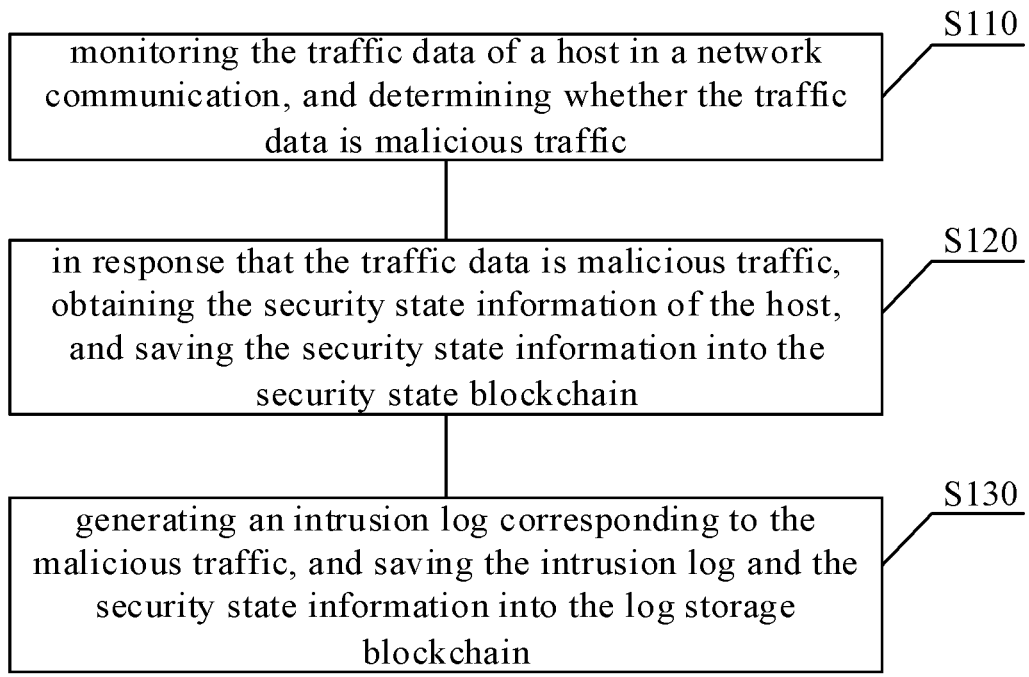
FIG. 1 schematically shows a flowchart of steps in a blockchain-based host security monitoring method in some embodiments of the present disclosure.

The present disclosure provides a blockchain-based host security monitoring method. FIG. 1 schematically shows a flowchart of steps in a blockchain-based host security monitoring method in some embodiments of the present disclosure. As shown in FIG. 1, the method mainly includes the following steps S110, S120, and S130.

In step S110, the traffic data of a host in a network communication is monitored, and it is determined whether the traffic data is malicious traffic.

The current host in the security monitoring state may communicate with other hosts on the Internet through a wired communication link or a wireless communication link. This step monitors the traffic data of the current host in the network communication process, and determines through traffic analysis whether the current communication traffic data is malicious traffic with offensive behavior or carrying abnormal files.

In step S120, in response that the traffic data is malicious traffic, the security state information of the host is obtained, and the security state information is saved into the security state blockchain.

According to the determination result in step S110, if the monitored traffic data is determined to be malicious traffic, then the current host is at risk of malicious intrusion. The security state information of the host reflects whether the host is successfully invaded by malicious traffic. If the current host is successfully invaded, files, users, logs, networks, processes and other related contents of the current host may be abnormal. Conversely, if malicious traffic fails to invade the current host, the relevant contents of the current host will be in a normal state. The security state information of the host may be expressed as two security state identifiers of "safe" and "intrusion", where "intrusion" means that the host is successfully invaded. As one of nodes in the security state blockchain network, the current host may save the security state information onto the security state blockchain. Thus, other nodes in the security state blockchain network may obtain the security state of the current host in a timely and accurate way.

In step S130, an intrusion log corresponding to the malicious traffic is generated, and the intrusion log and the security state information is saved into the log storage blockchain.

For the monitored intrusion behavior of the malicious traffic, logs may be recorded to generate corresponding intrusion logs. The intrusion log and the security state information of the host are saved on the log storage blockchain at the same time, which helps to realize the shared storage of intrusion behaviors and intrusion results. Thus, other nodes in the log storage blockchain network may effectively trace the history record of security monitoring.

In the blockchain-based host security monitoring method provided by some embodiments of the present disclosure, the current security state of the host is quickly and accurately identified, which helps to determine the impact scope of the network attacks on the enterprise. Besides, the host state information is established based on the state machine, which enables to trace the historical security state of the host. Furthermore, the source of intrusion is identified at the host level, which helps to restore the attack path, and improve the emergency response capability of the enterprise. Additionally, the host state identification is separated from the log storage, which helps to ensure the non-repudiation and integrity of the log based on the characteristics such as blockchain decentralization and non-repudiation.

Figure 2:
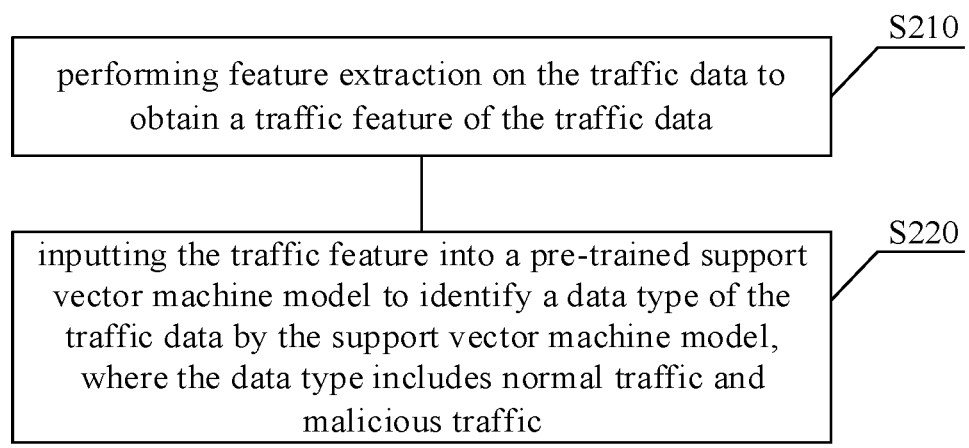
FIG. 2 schematically shows a flowchart of steps for determining attributes of traffic data in some embodiments of the present disclosure.

According to an embodiment of the present disclosure, a pre-trained machine learning model may be used to make determinations on attributes of the traffic data. FIG. 2 schematically shows a flowchart of steps for determining attributes of the traffic data in some embodiments of the present disclosure. As shown in FIG. 2, the determining whether the traffic data is malicious traffic in step S110 may include the following steps S210 and S220.

In step S210, feature extraction is performed on the traffic data to obtain a traffic feature of the traffic data.

The traffic feature of the traffic data may include a communication data feature related to the communication content and a source host feature related to the source host. The source host is another host that performs data communication with the current host in the network. The source host feature may include current security state information of the source host and historical security state information of the source host. The current security state information and the historical security state information of the source host may be information directly obtained from the security state blockchain.

In step S220, the traffic feature is input into a pre-trained support vector machine model to identify a data type of the traffic data by the support vector machine model. The data type includes normal traffic and malicious traffic.

Support Vector Machine (SVM) is a class of generalized linear classifiers that classify data binary in a supervised learning way, the decision boundary of which is the maximum margin hyperplane that is solved for the learning sample. SVM uses the hinge loss function to calculate the empirical risk and adds a regularization term to the solution system so as optimize the structural risk. It is a sparse and robust classifier. Through the pre-trained support vector machine model, the extracted traffic feature may be analyzed and calculated, and the corresponding traffic data may be classified as normal traffic or malicious traffic according to the analysis and calculation results.

Figure 3:
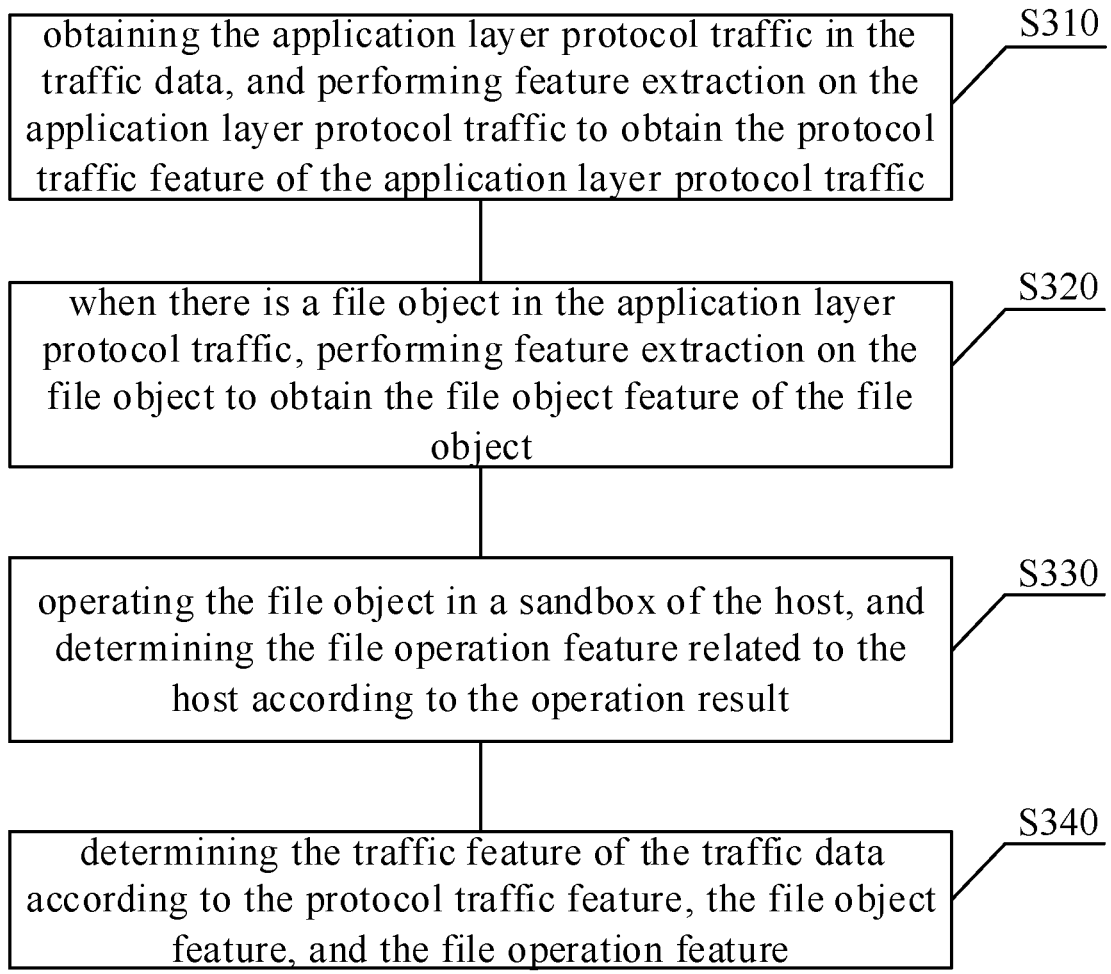
FIG. 3 schematically shows a flowchart of steps for extracting features from traffic data in some embodiments of the present disclosure.

FIG. 3 schematically shows a flowchart of steps for extracting features from traffic data in some embodiments of the present disclosure. As shown in FIG. 3, the performing feature extraction on the traffic data to obtain the traffic feature of the traffic data in step S210 may include the following steps S310, S320, S330, and S340.

In step S310, the application layer protocol traffic in the traffic data is obtained, and feature extraction is performed on the application layer protocol traffic to obtain the protocol traffic feature of the application layer protocol traffic.

The application layer protocol defines how application processes running on different end systems transfer messages to each other. For example, it may include File Transfer Protocol (FTP), HyperText Transfer Protocol (HTTP), and so on. Through feature extraction of the application layer protocol traffic, various protocol traffic features such as network address, port, protocol type, connection time, data packet length, and data packet content may be obtained.

In step S320, when there is a file object in the application layer protocol traffic, feature extraction is performed on the file object to obtain the file object feature of the file object.

In addition to the related data of the request message and the response message, the application layer protocol traffic may also carry a file object for file transmission. If there is a file object in the monitored application layer protocol traffic, then this step may separate the file object and perform feature extraction thereon, so as to obtain the corresponding file object feature. The file object feature may include, for example, file name, file format, file size, and other features.

In step S330, the file object is running in a sandbox of the host, and the file operation feature related to the host is determined according to the operation result.

Sandbox is a security mechanism that may provide an isolated environment for operating the file object. The sandbox may strictly control the resources that the file object can access during its operation. For example, the sandbox may provide disk and memory space that is reclaimed after use. In the sandbox, network access, access to the real system, and reading of input devices are usually prohibited or strictly restricted, and all changes in the sandbox will not cause any loss to the operation system. In this step, the separated file object is running in the sandbox of the host, which helps to safely and reliably monitor the operation process of the file object, and then determine the file operation feature related to the host according to the operation result of the file object. The file operation feature may include, for example, CPU state, memory state, network egress traffic state, and other features of the host.

In step S340, the traffic feature of the traffic data is determined according to the protocol traffic feature, the file object feature, and the file operation feature.

When there is a file object in the application layer protocol traffic, the protocol traffic feature, the file object feature, and the file operation feature extracted in the above steps may be combined into the traffic feature of the traffic data. If no file object is carried in the application layer protocol traffic, the traffic feature of the corresponding traffic data may be determined directly according to the protocol traffic feature.

Figure 4:
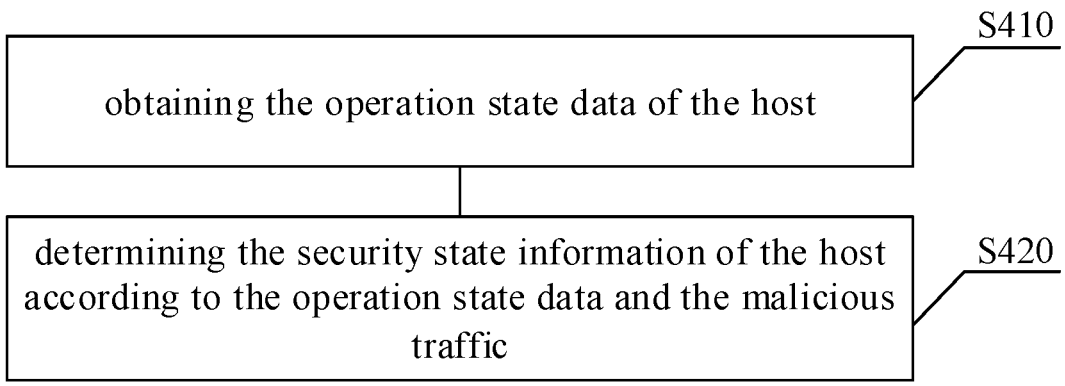
FIG. 4 schematically shows a flowchart of steps for obtaining security state information of a host in some embodiments of the present disclosure.

If the monitored traffic data is determined to be malicious traffic based on the traffic feature, then the malicious traffic may cause malicious attacks such as intruding the host, and therefore will also have a certain degree of impact on the security state of the host. FIG. 4 schematically shows a flowchart of steps for obtaining security state information of the host in some embodiments of the present disclosure. As shown in FIG. 4, the obtaining the security state information of the host in step S120 may include the following steps S410 and S420.

In step S410, the operation state data of the host is obtained.

In step S420, the security state information of the host is determined according to the operation state data and the malicious traffic.

Figure 5:
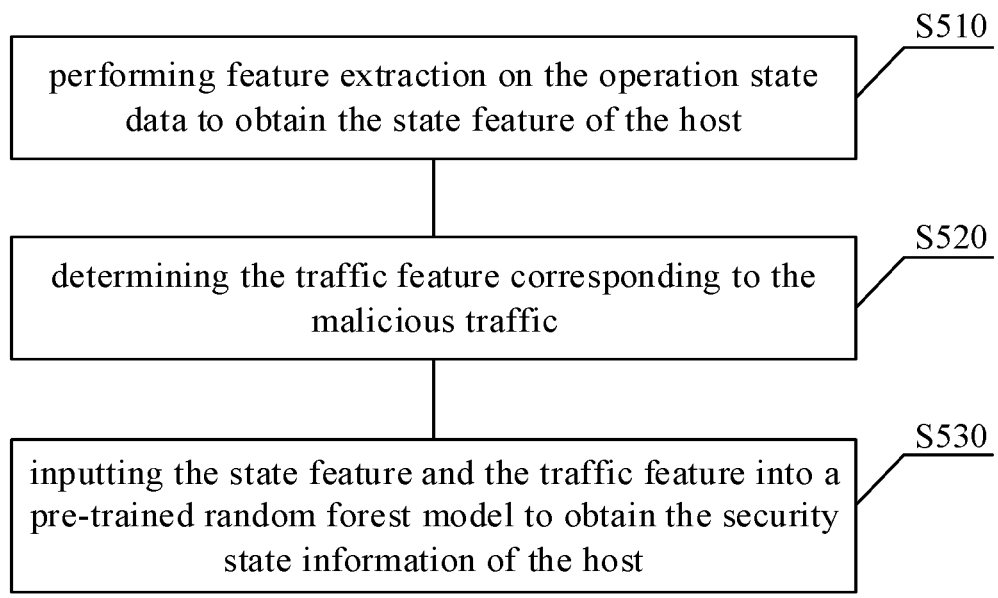
FIG. 5 schematically shows a flowchart of steps for determining security state information of a host in some embodiments of the present disclosure.

The operation state data of the host is obtained by collecting the local information of the current host. Based on the analysis of the operation state data and the malicious traffic, the security state information of the current host may be determined. FIG. 5 schematically shows a flowchart of steps for determining the security state information of the host in some embodiments of the present disclosure. As shown in FIG. 5, the determining the security state information of the host according to the operation state data and the malicious traffic in step S420 may include the following steps S510, S520, and S530.

In step S510, feature extraction is performed on the operation state data to obtain the state feature of the host.

Through feature extraction of the operation state data, various state data such as CPU usage, memory usage, network traffic size, and root users of the host may be obtained.

In step S520, the traffic feature corresponding to the malicious traffic is determined.

The traffic feature corresponding to the malicious traffic may include various features such as protocol traffic feature, file object feature, and file operation feature obtained by feature extraction in the above embodiments.

In step S530, the state feature and the traffic feature are input into a pre-trained random forest model to obtain the security state information of the host.

The random forest model is a classifier that uses multiple decision trees to train and predict samples. In this step, the random forest model may be used to analyze the state feature and the traffic feature to determine the security state information of the host. Taking the two-class identification as an example, this step may classify the security state information of the host into two types: "safe" and "intrusion".

Figure 6:
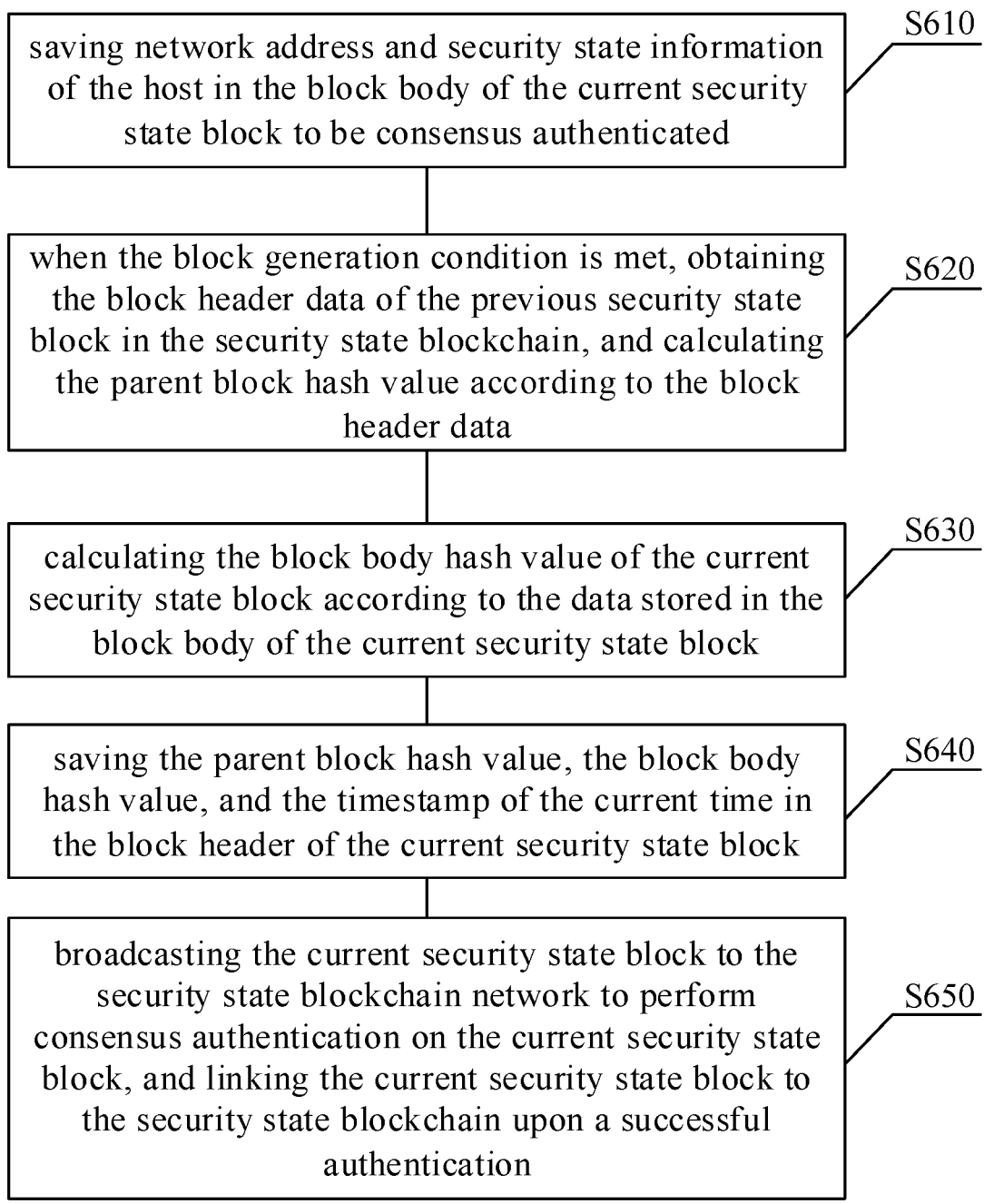
FIG. 6 schematically shows a flowchart of steps for storing security state information based on a blockchain in some embodiments of the present disclosure.

The use of blockchain technology to save the security state information of the host may be used to share data among multiple nodes in the blockchain network under the premise of ensuring the information accuracy. FIG. 6 schematically shows a flowchart of steps for saving the security state information based on a blockchain in some embodiments of the present disclosure. As shown in FIG. 6, the saving the security state information into the security state blockchain in step S120 may include the following steps S610, S620, S630, S640, and S650.

In step S610, network address and security state information of the host are saved in the block body of the current security state block to be consensus authenticated.

Each security state block that constitutes the security state blockchain includes two data storage areas: a block header and a block body. The block body is used to store all the data recorded in the current security state block. For example, network address and security state information of the host are stored in the block body of the current security state block. The block header is used to store the link information between the current security state block and the previous security state block. Using the data stored in the block header, all the security state blocks may be linked one by one to form a complete security state blockchain.

In step S620, when the block generation condition is met, the block header data of the previous security state block in the security state blockchain is obtained, and the parent block hash value is calculated according to the block header data.

When certain block generation condition is met, this step may obtain the block header data of the previous security state block (that is, the recently generated new security state block) in the security state blockchain network. Based on the block header, the parent block hash value of the current security state block may be calculated. For example, the SHA256 algorithm may be used to perform a hash operation on the block header data of the previous security state block to obtain a hash value, which is used as the parent block hash value of the current security state block. The block generation condition in this step may be that the generation time from the last security state block reaches a time threshold, or the data stored in the block body of the current security state block reaches a data volume threshold. Alternatively, the block generation condition may also be that another arbitrary preset condition for triggering the generation of a new block, which is not specifically limited in an embodiment of the present disclosure.

In step S630, the block body hash value of the current security state block is calculated according to the data stored in the block body of the current security state block.

The block body of the current security state block stores the network address and the security state information of the host formed within a period of time. According to the data stored in the block body, a hash value may be obtained in this step, serving as the block body hash value of the current security state block. Taking hash coding as an example, all the network addresses and security state information in the block body may be stored in the block body in the form of a Merkle Tree. Specifically, the network address and the security state information may be stored in the leaf nodes of the Merkel tree. The network address and the security state information stored in every two adjacent leaf nodes may be combined and then hashed again to get a hash value stored in the child node. Using this way of performing a hash operation layer by layer on the pairwise combination of the hash values stored in the child nodes, a root node hash value may be finally obtained, and the root node hash value may be used as the block body hash value of the current security state block.

In step S640, the parent block hash value, the block body hash value, and the timestamp of the current time are saved in the block header of the current security state block.

After the parent block hash value and the block body hash value are respectively calculated in step S620 and step S630, this step may generate a timestamp according to the current time, and the timestamp is used to record the generation time of the current security state block. Then, the parent block hash value, the block body hash value, and the timestamp may be stored together in the block header of the current security state block.

In step S650, the current security state block is broadcasted to the security state blockchain network to perform consensus authentication on the current security state block, and the current security state block is linked to the security state blockchain upon a successful authentication.

After saving the block header data, this step will broadcast the current security state block composed of the block header and the block body to the security state blockchain network. After the consensus authentication is successful, all or part of the blockchain nodes in the security state blockchain network save the current security state block, thus completing the inlinking process of the current security state block in the security state blockchain.

Figure 7:
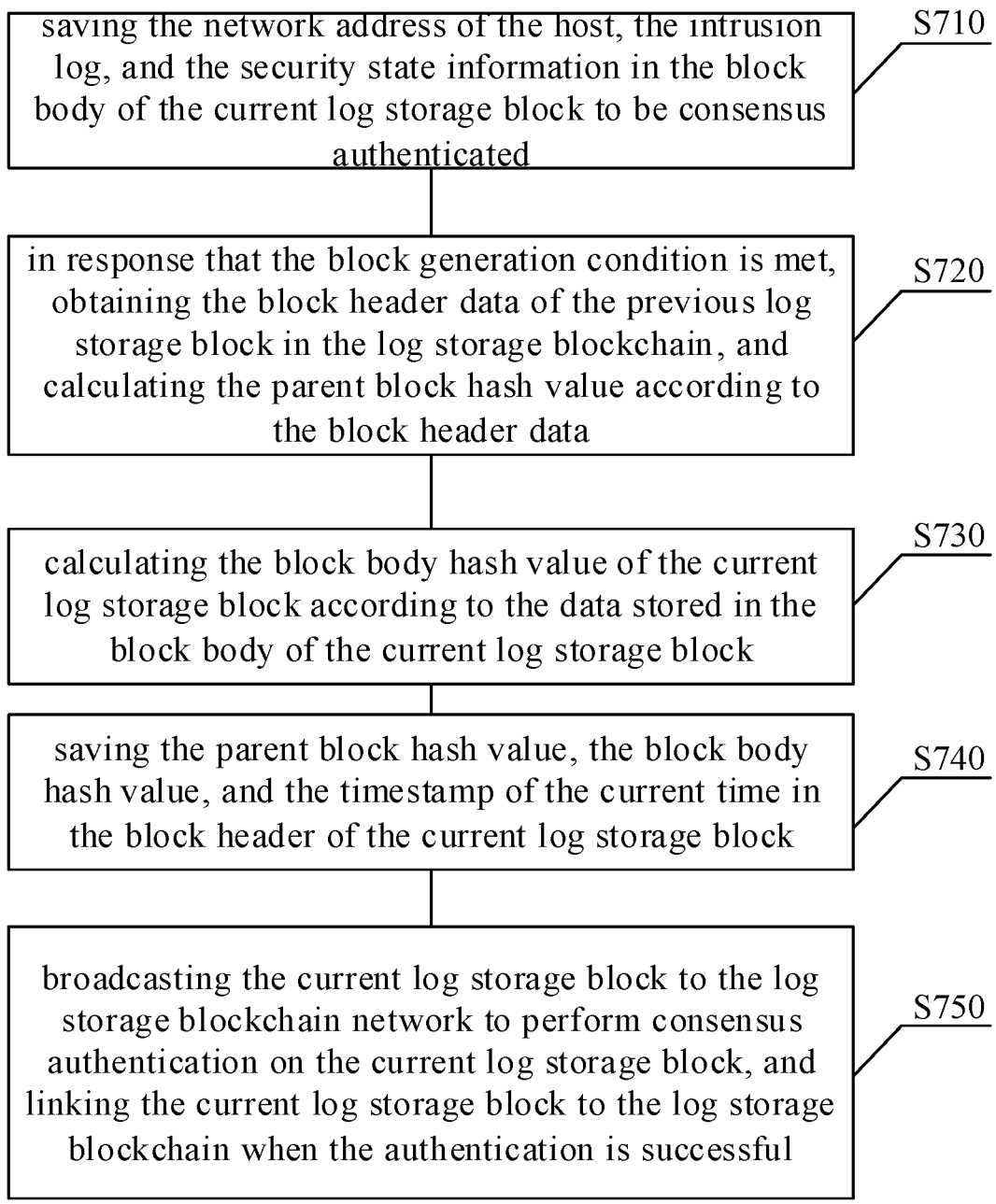
FIG. 7 schematically shows a flowchart of steps for saving a log based on a blockchain in some embodiments of the present disclosure.

FIG. 7 schematically shows a flowchart of steps for saving a log based on a blockchain in some embodiments of the present disclosure. As shown in FIG. 7, the saving the intrusion log and the security state information in the log storage blockchain in step S130 may include the following steps S710, S720, S730, S740, and S750.

In step S710, the network address of the host, the intrusion log, and the security state information are saved in the block body of the current log storage block to be consensus authenticated.

Each log storage block that makes up the log storage blockchain includes two data storage areas: a block header and a block body. The block body is used to store all the data recorded in the current log storage block. For example, the host's address network, the intrusion log, and the security state information are stored in the block body of the current log storage block. The block header is used to store the link information between the current log storage block and the previous log storage block. Using the data stored in the block header, all the log storage blocks may be linked one by one to form a complete log storage blockchain.

In step S720, in response that the block generation condition is met, the block header data of the previous log storage block in the log storage blockchain is obtained, and the parent block hash value is calculated according to the block header data.

When certain block generation condition is met, this step may obtain the block header data of the previous log storage block (that is, the recently generated new log storage block) in the log storage blockchain network. Based on the block header data, the parent block hash value of the current log storage block may be obtained by calculation. For example, the SHA256 algorithm may be used to perform a hash operation on the block header data of the previous log storage block to obtain a hash value, which is used as the parent block hash value of the current log storage block. The block generation condition in this step may be that the generation time from the previous log storage block reaches a time threshold, or the data stored in the block body of the current log storage block reaches a data volume threshold. Alternatively, the block generation condition may be also that another arbitrary preset condition for triggering the generation of a new block, which is not specifically limited in an embodiment of the present disclosure.

In step S730, the block body hash value of the current log storage block is calculated according to the data stored in the block body of the current log storage block.

The block body of the current log storage block stores the network address of the host, the intrusion log, and the security state information formed over a period of time. According to the data stored in the block body, a hash value may be obtained in this step, serving as the block body hash value of the current log storage block. Taking hash coding as an example, all the network addresses, the intrusion logs, and the security state information in the block body may be stored in the block body in the form of a Merkle Tree. Specifically, the network address, the intrusion log, and the security state information may be stored in the leaf nodes of the Merkel tree. The network address, the intrusion log, and the security state information stored in every two adjacent leaf nodes may be combined and hashing again, so as to get a hash value stored in the child node. Using this way of performing a hash operation layer by layer on the pairwise combination of the hash values stored in the child nodes, a root node hash value may be obtained eventually, which may be used as the block body hash value of the current log storage block.

In step S740, the parent block hash value, the block body hash value, and the timestamp of the current time are saved in the block header of the current log storage block.

After the parent block hash value and the block body hash value are respectively calculated in step S720 and step S730, this step may generate a timestamp according to the current time, and the timestamp is used to record the generation time of the current log storage block. Then, the parent block hash value, the block body hash value, and the timestamp may be stored together in the block header of the current log storage block.

In step S750, the current log storage block is broadcasted to the log storage blockchain network to perform consensus authentication on the current log storage block, and the current log storage block is linked to the log storage blockchain when the authentication is successful.

After the block header data is saved, this step will broadcast the current log storage block composed of the block header and the block body to the log storage blockchain network. After the consensus authentication is successful, all or some of the blockchain nodes in the log storage blockchain network save the current log storage block, thereby completing the inlinking process of the current log storage block in the log storage blockchain.

It should be noted that although the above exemplary embodiments describe steps of the method in the present disclosure in a specific order, this does not require or imply that these steps must be performed in the specific order, or that all the steps must be performed to achieve the desired result. Additionally or alternatively, some steps may be omitted, multiple steps may be combined into one step for execution, and/or one step may be decomposed into multiple steps for execution, etc.

Figure 8:
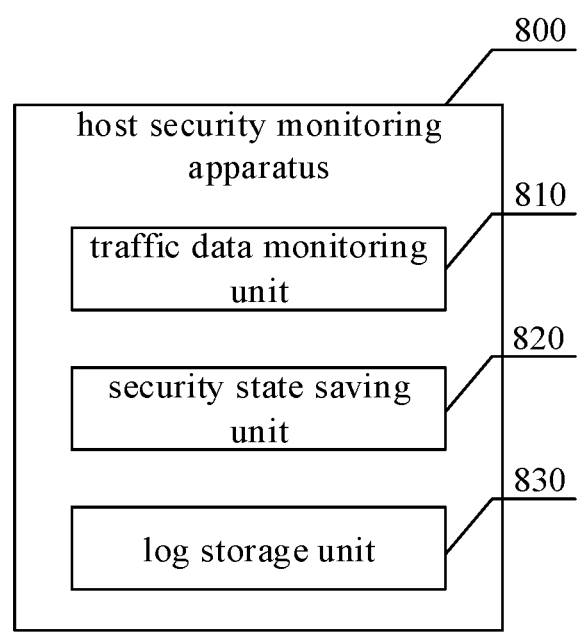
FIG. 8 schematically shows a block diagram of a blockchain-based host security monitoring apparatus in some embodiments of the present disclosure.

FIG. 8 schematically shows a block diagram of a blockchain-based host security monitoring apparatus in some embodiments of the present disclosure. As shown in FIG. 8, the host security monitoring apparatus 800 may mainly include a traffic data monitoring unit 810, a security state saving unit 820, and a log storage unit 830.

The traffic data monitoring unit 810 is configured to monitor the traffic data of the host in a network communication, and determine whether the traffic data is malicious traffic.

The security state saving unit 820 is configured to obtain the security state information of the host and save the security state information into the security state blockchain in response that the traffic data is malicious traffic.

The log storage unit 830 is configured to generate an intrusion log corresponding to the malicious traffic, and save the intrusion log and the security state information into the log storage blockchain.

In some embodiments of the present disclosure, the traffic data monitoring unit 810 may further include a traffic feature extraction unit and a first model prediction unit.

The traffic feature extraction unit is configured to perform feature extraction on the traffic data to obtain the traffic feature of the traffic data.

The first model prediction unit is configured to input the traffic feature into a pre-trained support vector machine model to identify the data type of the traffic data by the support vector machine model. The data type includes normal traffic and malicious traffic.

In some embodiments of the present disclosure, the traffic feature extraction unit may further include a protocol traffic feature extraction unit, a file object feature extraction unit, a file operation feature extraction unit, and a first traffic feature determination unit.

The protocol traffic feature extraction unit is configured to obtain the application layer protocol traffic in the traffic data, and perform feature extraction on the application layer protocol traffic to obtain the protocol traffic feature of the application layer protocol traffic.

The file object feature extraction unit is configured to perform feature extraction on a file object when the file object exists in the application layer protocol traffic, so as to obtain the file object feature of the file object.

The file operation feature extraction unit is configured to operate the file object in the sandbox of the host, and determine the file operation feature related to the host according to the operation result.

The first traffic feature determination unit is configured to determine the traffic feature of the traffic data according to the protocol traffic feature, the file object feature, and the file operation feature.

In some embodiments of the present disclosure, the security state saving unit 820 may include an operation state data obtaining unit and a security state information determination unit.

The operation state data obtaining unit is configured to obtain the operation state data of the host.

The security state information determination unit is configured to determine the security state information of the host according to the operation state data and the malicious traffic.

In some embodiments of the present disclosure, the security state information determination unit may include a state feature extraction unit, a second traffic feature determination unit, and a second model prediction unit.

The state feature extraction unit is configured to perform feature extraction on the operation state data to obtain the state feature of the host.

The second traffic feature determination unit is configured as a traffic feature corresponding to the malicious traffic.

The second model prediction unit is configured to input the state feature and the traffic feature into a pre-trained random forest model to obtain the security state information of the host.

In some embodiments of the present disclosure, the security state saving unit 820 further includes a first block body saving unit, a first parent block hash value generation unit, a first block body hash value generation unit, a first block hear saving unit, and a first blockchain linking unit.

The first block body saving unit is configured to save the network address and the security state information of the host in the block body of the current security state block to be consensus authenticated.

The first parent block hash value generation unit is configured to, in response that the block generation condition is met, obtain the block header data of the previous security state block in the security state blockchain, and calculate the parent block hash value according to the block header data.

The first block body hash value generation unit is configured to calculate the block body hash value of the current security state block according to the data saved in the block body of the current block.

The first block header saving unit is configured to save the parent block hash value, the block body hash value and the timestamp of the current time in the block header of the current security state block.

The first block linking unit is configured to broadcast the current security state block to the security state blockchain network to perform consensus authentication on the current security state block, and link the current security state block to the security state blockchain when the authentication is successful.

In some embodiments of the present disclosure, the log storage unit 830 may include a second block body saving unit, a second parent block hash value generation unit, a second block body hash value generation unit, a second block header saving unit, and a second blockchain linking unit.

The second block body saving unit is configured to save the network address of the host, the intrusion log, and the security state information in the block body of the current log storage block to be consensus authenticated.

The second parent block hash value generation unit is configured to, in response that the block generation condition is met, obtain the block header data of the previous log storage block in the log storage blockchain, and calculate the parent block hash value according to the block header data.

The second block body hash value generation unit is configured to calculate the block body hash value of the current log storage block according to the data stored in the block body of the current log storage block.

The second block header saving unit is configured to save the parent block hash value, the block body hash value, and the timestamp of the current time in the block header of the current log storage block.

The second block linking unit is configured to broadcast the current log storage block to the log storage blockchain network to perform consensus authentication on the current log storage block, and link the current log storage block to the log storage blockchain when the authentication is successful.

The specific details of the above-mentioned blockchain-based host security monitoring apparatus have been described in detail in the corresponding blockchain-based host security monitoring method, so it will not be repeated here.

The following describes the details of the blockchain-based host security monitoring method and the blockchain-based host security monitoring apparatus in the above embodiments of the present disclosure in conjunction with a specific application scenario.

Figure 9:
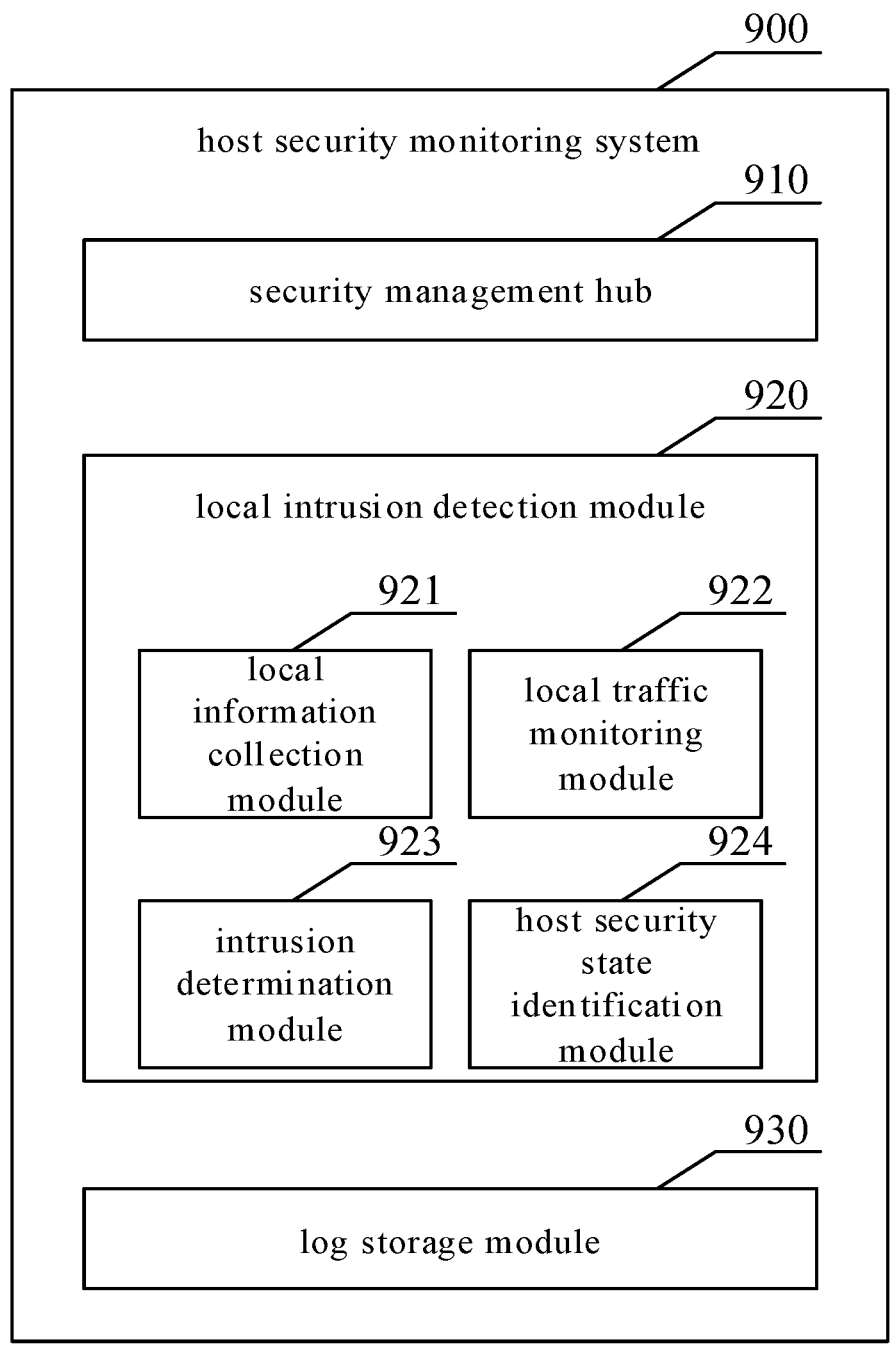
FIG. 9 schematically shows a overall architecture of a host security monitoring system provided by an embodiment of the present disclosure.

FIG. 9 schematically shows the overall architecture of a host security monitoring system provided by an embodiment of the present disclosure. As shown in FIG. 9, the host security monitoring system 900 mainly includes three parts: a security management hub 910, a local intrusion detection module 920, and a log storage module 930.

The security management hub 910 is mainly responsible for the management and maintenance operations of the local intrusion detection module 920, distributing the machine learning detection model optimized by manual training, and in the meanwhile obtaining logs from the log storage module 930 and displaying the log results.

The local intrusion detection module 920 is deployed on the operation system of each host under the system monitoring and is the end node of the host security monitoring system. The local intrusion detection module 920 performs regular scanning and real-time traffic monitoring on the current host, and is responsible for identifying attack behaviors, recording attack logs and timestamps, maintaining host security state identifiers, and calculating hashes of host security state, logs, and timestamp.

The local intrusion detection module 920 may mainly include four sub-modules: a local information collection module 921, a local traffic monitoring module 922, an intrusion determination module 923, and a host security state identification module 924. The host security state includes "safe" and "intrusion", where "intrusion" refers to a host being successfully invaded.

The local information collection module 921 is responsible for collecting various state information of the local client.

The local traffic monitoring module 922 is responsible for real-time monitoring of the communication traffic of the current host.

The intrusion determination module 923 makes determinations on the results of local information collection and traffic monitoring through the security detection model, so as to make further responses.

Figure 10:
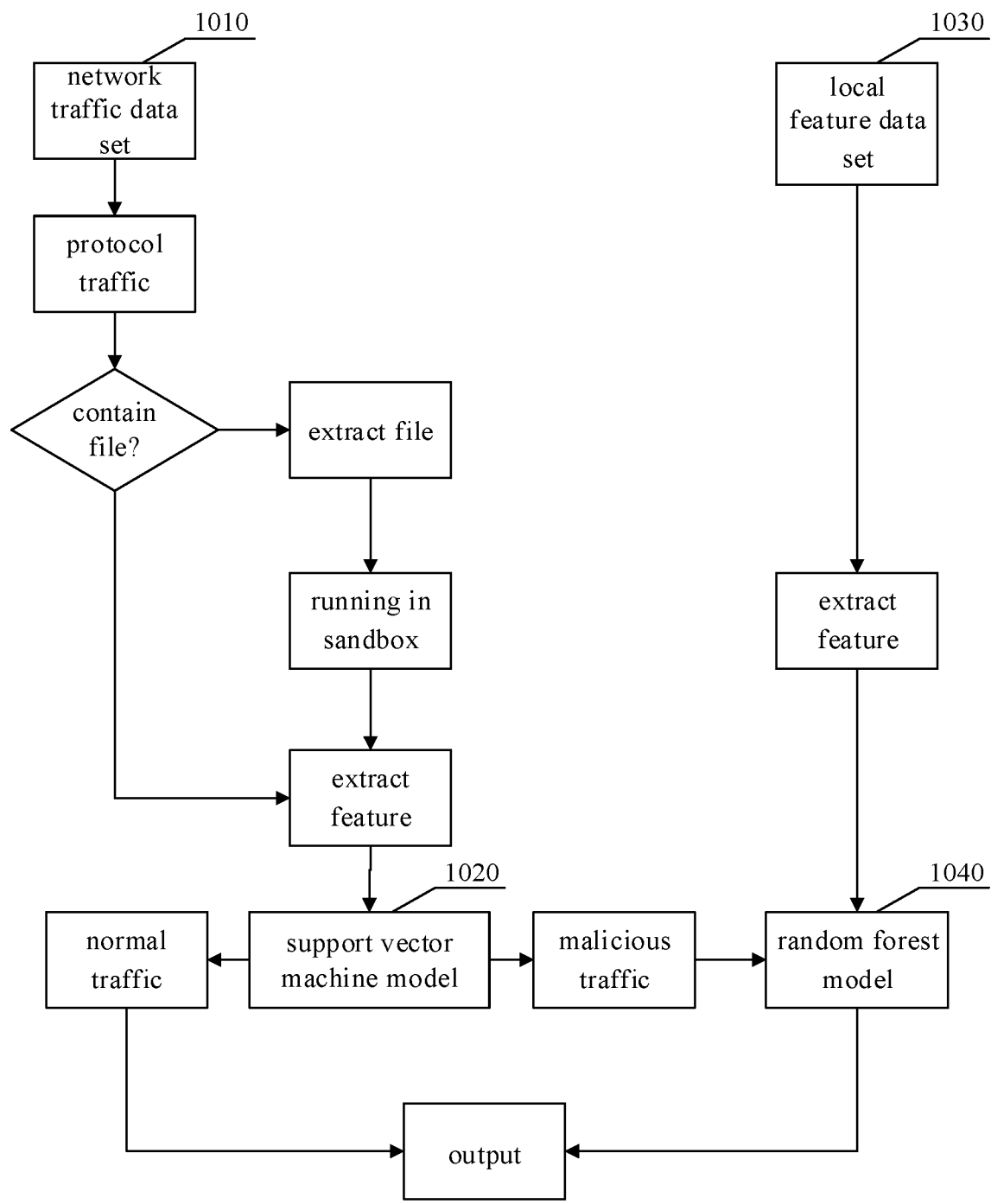
FIG. 10 schematically shows a schematic diagram of the detection determination principle of a safety detection model.

FIG. 10 schematically shows a schematic diagram of the detection determination principle of the security detection model. As shown in FIG. 10, the local traffic monitoring module 922 may obtain the network traffic data set 1010 by monitoring the communication traffic of the current host, and then perform feature extraction on the application layer protocol traffic in the traffic data to obtain the protocol traffic feature. If the traffic data contains a file, the file is extracted and executed in the sandbox, and the file object feature of the file itself is extracted and the file operation feature after the file is extracted.

The protocol traffic feature may mainly include: source host network address, source host port, destination host network address, destination host port, protocol type, connection time, request packet length, request packet content, response packet length, response packet content, number of first p communication connections being the same as the current data packet, first q security state identifiers of source host, and current security state identifier of source host, where p and q are preset numbers. For example, p may be 50, and q may be 5.

The file object feature and the file operation feature may mainly include: file name, file hash, user execution authority, CPU state, memory state, hard disk read and write state, network exit traffic state, system user change, whether to include daemons, daemons name, shell command execution record, host firewall configuration change.

The traffic feature of the above traffic data may be input to the intrusion determination module 923. Then, the support vector machine model 1020 determines whether the currently monitored traffic data is normal traffic or malicious traffic according to the feature of the traffic data.

If it is determined that the traffic data is normal traffic, the current determination result is directly output as safe.

If it is determined that the traffic data is malicious traffic, it is necessary to continue to determine whether the current host is successfully invaded under the attack of the malicious traffic.

The local information collection module 921 may obtain the local feature data set 1030 of the host by collecting local information. By performing feature extraction on the local feature data set 1030, the state feature of the operation state data may be obtained.

The state feature of the operation state data may mainly include: CPU usage, memory usage, network traffic size, root user, system user change, main command file link location, main command file hash, and first s times of login state for all users, last t shell execution records of user. Both s and t are preset numbers. For example, s may take a value of 5, and t may take a value of 100.

The state feature of the current host and the traffic feature of the malicious traffic are input to the intrusion determination module 923. Then the random forest model 1040 determines whether the current host is successfully invaded according to the state feature and the traffic feature, and outputs the corresponding determination result at the same time.

The host security state identification module 924 may identify the current host security state based on the determination result of the intrusion determination module 923. When the attack traffic or the host behavior feature are found to match the intrusion rule, the host state is marked as "intrusion" and the log recording function is enabled. When the intruding host sends malicious traffic to the host but the intrusion is not successful, only the log recording function is enabled.

When the host is invaded, the current state is marked as intrusion, and the current host timestamp, security state identifier, hash (timestamp+host ip+host security state) are written into the security state blockchain corresponding to the local intrusion detection module 920. The current host timestamp, security state identifier, intrusion log, hash (timestamp+host ip+intrusion log+host security state) are reported to the log storage module 930, and then written by the log storage module 930 into the log storage blockchain.

The security state blockchain mainly maintains the security identification information of the host, thus ensuring that each host knows the security state identifier of the other host during communication. When the local intrusion detection module 920 detects that the host with the security state identified as "intrusion" initiates a connection to the host, it may analyze the communication traffic between the two parties and report the attack behavior to the log storage module.

The intrusion log about attacking network traffic may be divided into two levels: intrusion behavior and successful intrusion. Specifically, the level of the intrusion log reported to the log storage module 930 may be adjusted by setting a threshold.

The log storage module 930 is the information gathering place of the host security monitoring system 900, and uses the blockchain technology to store the logs reported by the client. Compared with the security state blockchain, the log storage blockchain introduces intrusion logs. Transferring the intrusion log storage from the client to the log storage blockchain helps to effectively reduce the load on the client and ensure the non-repudiation and integrity of information.

Figure 11:
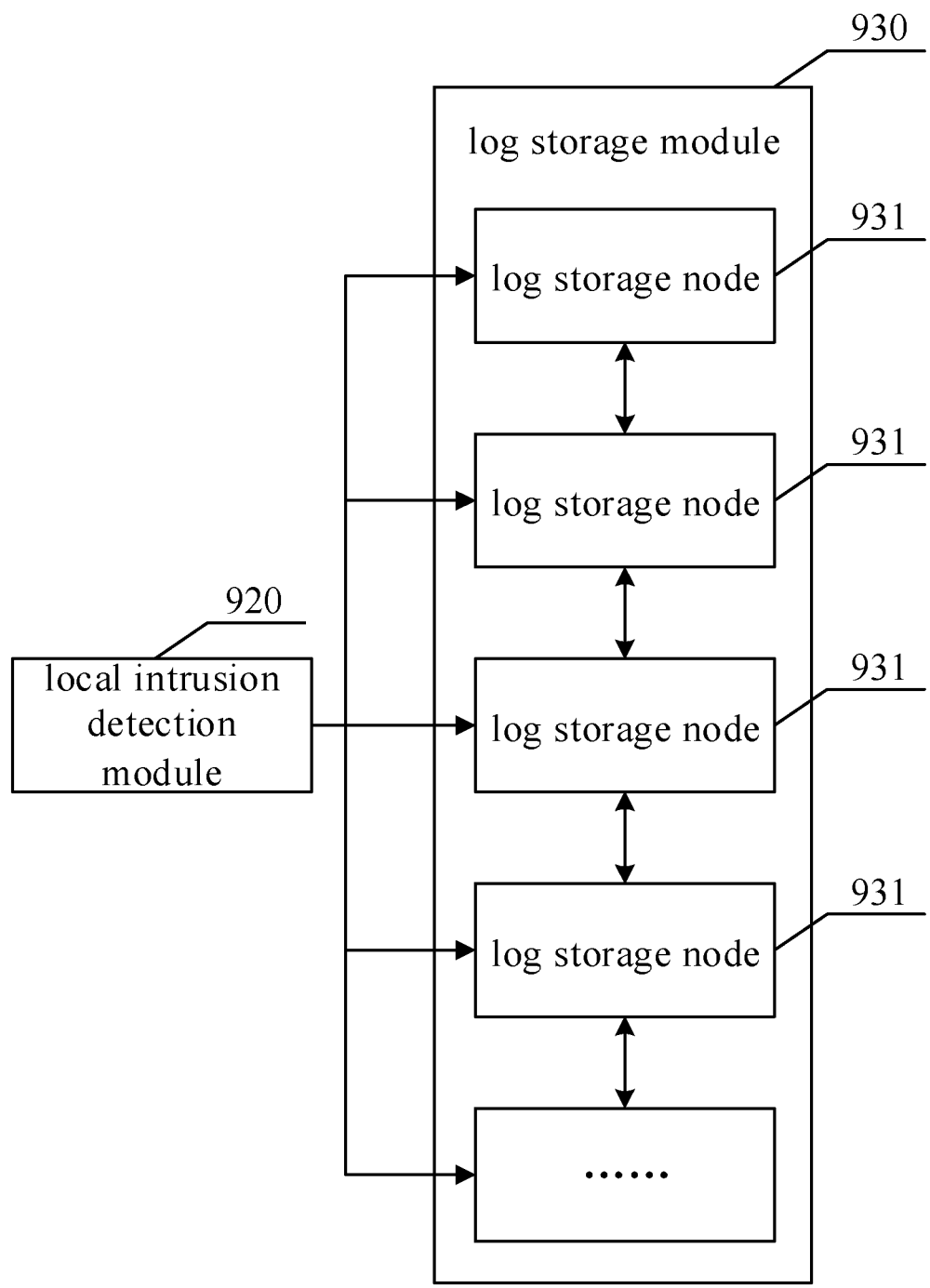
FIG. 11 schematically shows a schematic diagram of the blockchain network principle of a log storage module.

As shown in FIG. 11, the log storage module 930 includes a plurality of log storage nodes 931 constituting a blockchain network, and each log storage node is deployed on a log server. These nodes jointly maintain the log storage blockchain.

The local intrusion detection module 920 randomly selects n log storage nodes 931 that can communicate normally and sends intrusion logs to them, where n>=2, thus preventing the log recording module from losing logs due to a single point of failure. After the log storage module node receives the data, it verifies the data, and writes it to the log storage blockchain after the verification is successful.

Figure 12:
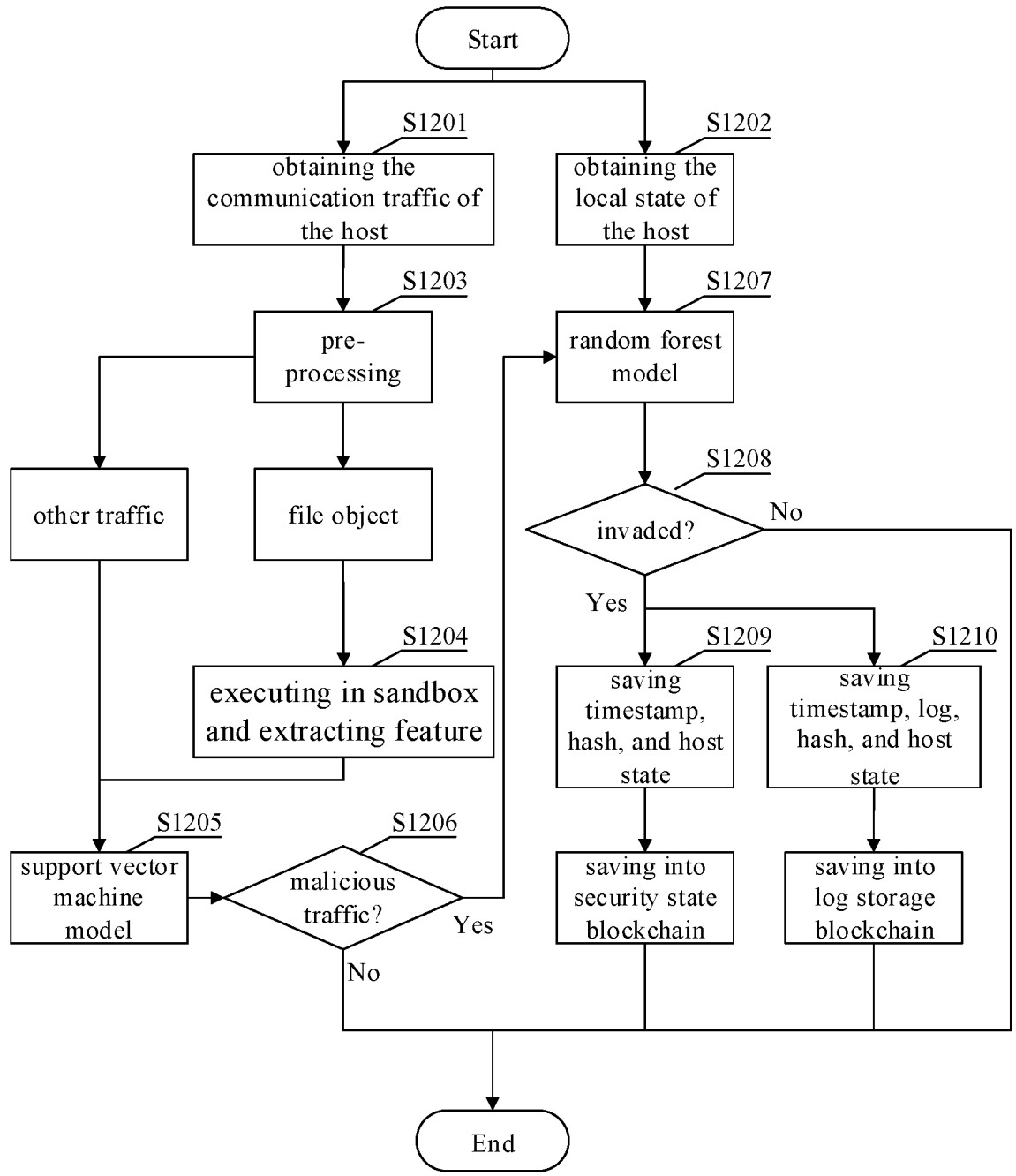
FIG. 12 schematically shows a host security monitoring process based on a host security monitoring system.

FIG. 12 schematically shows the host security monitoring process based on the host security monitoring system. As shown in FIG. 12, the monitoring process mainly includes the following steps S1201, S1202, S1203, S1204, S1205, S1206, S1207, S1208, S1209, and S1210.

In step S1201, the communication traffic of the host is obtained.

In step S1202, the local state of the host is obtained.

In step S1203, the communication traffic of the host is pre-processed to determine the file object and other traffic.

In step S1204, the file object is executed in the sandbox and a feature is extracted.

In step S1205, the feature of the other traffic and the feature obtained by executing the file object are input into the support vector machine model.

In step S1206, it is determined whether the current communication traffic data is malicious traffic according to the output result of the support vector machine. If it is not malicious traffic, the process ends. If it is malicious traffic, step S1207 is executed.

In step S1207, the feature of the malicious traffic and the feature of the local state of the host are input into a random forest model.

In step S1208, it is determined whether the current host is successfully invaded according to the output result of the random forest model. If the intrusion fails, the process ends. If the intrusion is successful, steps S1209 and S1210 are executed.

In step S1209, the timestamp, hash, and host state are saved to the security state blockchain, and the process ends.

In step S1210, the timestamp, log, hash, and host state are saved to the log storage blockchain and the process ends.

According to an embodiment of the present disclosure, intrusion detection capabilities are provided to each asset in the organization. This helps to significantly improve the intrusion detection capabilities of organization, monitor more comprehensively the historical state information of the organization's assets, and quickly and reliably record intrusion logs about attack behaviors. Thus, the organization is enabled to determine the impact scope of attack in a timely way, improve the organization's emergency response capabilities, and ensure the organization's business continuity. At the same time, credible logs ensure the effectiveness of evidence collection.

It should be noted that although several modules or units of the device for action execution are mentioned in the above detailed description, such division is not mandatory. In fact, according to some embodiments of the present disclosure, the features and functions of two or more modules or units described above may be embodied in one module or unit. Conversely, the features and functions of a module or unit described above may be further divided into multiple modules or units to be embodied.

In an exemplary embodiment of the present disclosure, there is also provided a computer-readable medium having a computer program stored thereon. When executed by a processor, the computer program can implement the above-mentioned method according an embodiment of the present disclosure. In some possible implementations, various aspects of the present disclosure may also be implemented in the form of a program product, which includes program code. The program product may be stored in a non-volatile storage medium (which may be a CD-ROM, U Disk or mobile hard disk, etc.) or stored on a network. When the program product runs on a computing device (which may be a personal computer, a server, a terminal device, or a network device, etc.), the program code is used to configure the computing device to perform steps of the method in the above-mentioned exemplary embodiments of the present disclosure.

Figure 13:
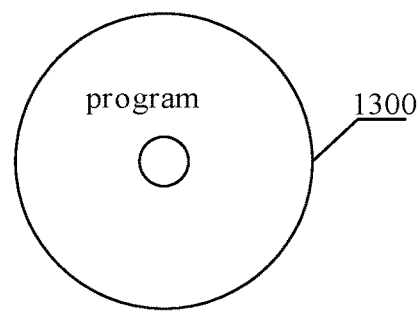
FIG. 13 schematically shows a schematic diagram of a program product in an embodiment of the present disclosure.

Referring to FIG. 13, the program product 1300 for implementing the above-mentioned method according to an embodiment of the present disclosure may adopt a portable compact disk read-only memory (CD-ROM) and include program code, and may be run in a computing device (such as a personal computer, server, terminal device or network device, etc.). However, the program product according to an embodiment of the present disclosure is not limited to it. In an exemplary embodiment, the computer-readable storage medium may be any tangible medium that contains or stores a program. The program may be used by or in combination with an instruction execution system, apparatus, or device.

The program product may use any combination of one or more readable media. The readable medium may be a readable signal medium or a readable storage medium.

The readable storage medium may be, for example, but not limited to, an electrical, magnetic, optical, electromagnetic, infrared, or semiconductor system, apparatus, or device, or a combination of any of the above. More specific examples (non-exhaustive list) of readable storage media include: electrical connections with one or more wires, portable disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above.

The readable signal medium may include a data signal propagated in baseband or as a part of a carrier wave, and readable program code is carried therein. Such propagated data signal may take many forms, including but not limited to electromagnetic signals, optical signals, or any suitable combination of the foregoing. The readable signal medium may also be any readable medium other than the readable storage medium. The readable medium may send, propagate, or transmit the program for use by or in combination with the instruction execution system, apparatus, or device.

The program code contained on the readable medium may be transmitted by any suitable medium, including but not limited to wireless, wired, optical cable, RF, etc., or any suitable combination of the foregoing.

The program code used to perform the operations according to an embodiment of the present disclosure may be written in any combination of one or more programming languages. The programming languages include an object-oriented programming language, such as Java, C++, etc., as well as a conventional procedural programming language, such as C or similar programming language. The program code may be executed entirely on the user's computing device, partly on the user's computing device, executed as an independent software package, partly executed on the user's computing device and partly executed on the remote computing device, or entirely executed on a remote computing device or a server. In the case of a remote computing device, the remote computing device may be connected to a user computing device through any kind of network (including a local area network (LAN) or a wide area network (WAN), etc.). Alternatively, it may be connected to an external computing device, for example, via the Internet using Internet service providers.

In an exemplary embodiment of the present disclosure, there is also provided an electronic device, including at least one processor and at least one memory for storing executable instructions being executable by the processor. The processor is configured to execute steps of the method in the above-mentioned exemplary embodiments of the present disclosure by executing the executable instructions.

The electronic device 1400 in an exemplary embodiment will be described below with reference to FIG. 14. The electronic device 1400 is only an example, and should not bring any limitation to the function and use scope of embodiments of the present disclosure.

Figure 14:
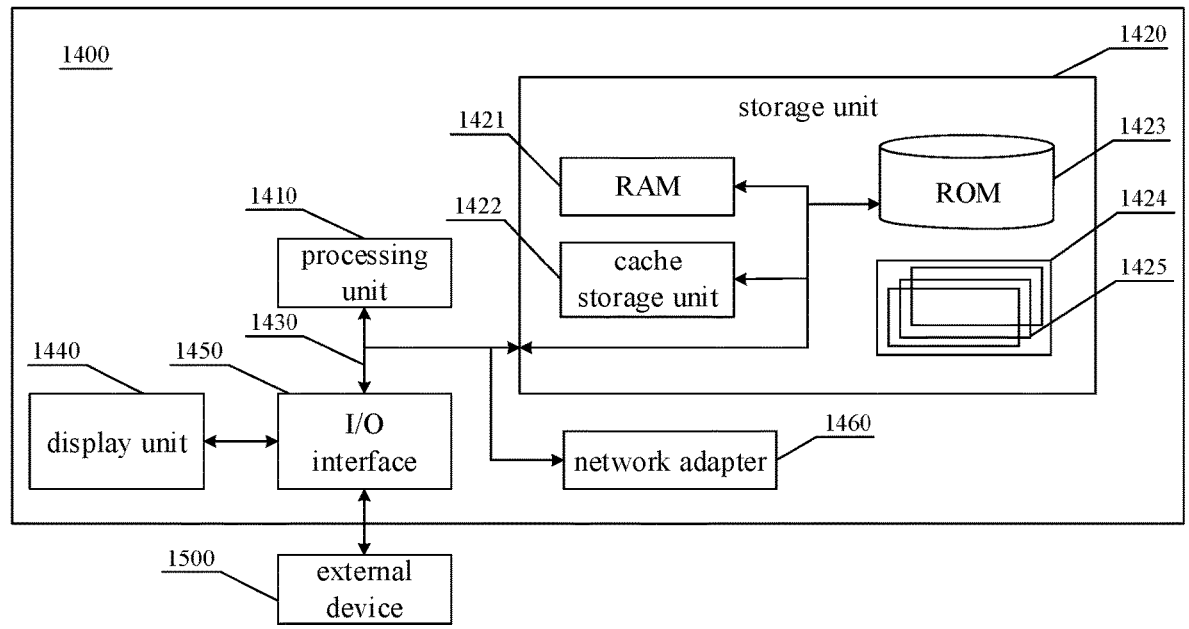
FIG. 14 schematically shows a schematic modular diagram of an electronic device in an embodiment of the present disclosure.

Referring to FIG. 14, the electronic device 1400 is represented in the form of a general-purpose computing device. The components of the electronic device 1400 may include but are not limited to: at least one processing unit 1410, at least one storage unit 1420, a bus 1430 connecting different system components (including the processing unit 1410 and the storage unit 1420), and a display unit 1440.

The storage unit 1420 stores program codes, and the program codes may be executed by the processing unit 1410, so that the processing unit 1410 performs steps of the method in the foregoing exemplary embodiments of the present disclosure.

The storage unit 1420 may include a readable medium in the form of a volatile storage unit, such as a random access storage unit 1421 (RAM) and/or a cache storage unit 1422, and may further include a read-only storage unit 1423 (ROM).

The storage unit 1420 may also include a program/utility tool 1424 having a set of (at least one) program modules 1425. Such program modules include but are not limited to: an operation system, one or more application programs, other program modules, and program data. Each or some combination of the examples may include the implementation of a network environment.

The bus 1430 may represent one or more of several types of bus structures, including a storage unit bus or a storage unit controller, a peripheral bus, a graphics acceleration port, a processing unit, or a local area that uses any of various bus structures.

The electronic device 1400 may also communicate with one or more external devices 1500 (such as keyboards, pointing devices, Bluetooth devices, etc.), and may also communicate with one or more devices that allow a user to interact with the electronic device 1400. Alternatively, it may also communicate with any device (such as router, modem, etc.) that enables the electronic device 1400 to communicate with one or more other computing devices. Such communication may be performed through an input/output (I/O) interface 1450. In addition, the electronic device 1400 may also communicate with one or more networks (for example, local area network (LAN), wide area network (WAN), and/or public network, such as the Internet) through the network adapter 1460. As shown in FIG. 14, the network adapter 1460 may communicate with other modules of the electronic device 1400 through the bus 1430. It should be understood that although not shown in the figures, other hardware and/or software modules may be used in conjunction with the electronic device 1400, including but not limited to: microcode, device drivers, redundant processing units, external disk drive arrays, RAID systems, tape drives and data backup storage system, etc.

Those skilled in the art can understand that various aspects of the present disclosure may be implemented as a system, a method, or a program product. Therefore, various aspects of the present disclosure may be specifically implemented in the following forms, namely: a complete hardware: implementation, a complete software implementation (including firmware, microcode, etc.), or a combination of hardware and software, which may be collectively referred to herein as "circuit", "module" or "system".

Those skilled in the art will easily think of other embodiments of the present disclosure after considering the specification and practicing the content disclosed herein. The present application is intended to cover any variations, uses, or adaptive changes of the present disclosure. These variations, uses, or adaptive changes follow the general principle of the present disclosure and include common knowledge or conventional technical means in the technical field that are not disclosed in the present disclosure. The description and embodiments are only regarded as exemplary, and the true scope and spirit of the present disclosure are indicated by the appended claims.

The features, structures, or characteristics described above may be combined in one or more embodiments in any suitable manner. If possible, the features discussed in embodiments are interchangeable. In the above description, many specific details are provided to give a sufficient understanding of embodiments of the present disclosure. However, those skilled in the art will realize that the technical solutions of the present disclosure may be practiced without one or more of the specific details, or other methods, components, materials, etc. In other cases, well-known structures, materials, or operations are not shown or described in detail to avoid obscuring aspects of the present disclosure.

The invention claimed is:

1. A blockchain-based host security monitoring method, comprising:
monitoring traffic data of a host in a network communication and determining whether the traffic data is malicious traffic;
in response the determining that the traffic data is the malicious traffic, obtaining security state information of the host and saving the security state information into a security state blockchain; and
generating an invasion log corresponding to the malicious traffic and saving the invasion log and the security state information into a log storage blockchain,
wherein the saving the security state information into the security state blockchain comprises:
saving a network address of the host and the security state information into a block body of a current security state block to be consensus authenticated;
in response that a block generation condition is met, obtaining block header data of a previous security state block in the security state blockchain, and obtaining a parent block hash value by calculation according to the block header data;
calculating a block body hash value of the current security state block according to data saved in the block body of the current block;
saving the parent block hash value, the block body hash value and a timestamp of a current time into a block header of the current security state block; and
broadcasting the current security state block to a security state blockchain network to perform consensus authentication on the current security state block, and linking the current security state block onto the security state blockchain upon a successful authentication.

2. The blockchain-based host security monitoring method according to claim 1, wherein the determining whether the traffic data is the malicious traffic comprises:
performing feature extraction on the traffic data to obtain a traffic feature of the traffic data;
inputting the traffic feature into a pre-trained support vector machine model to identify a data type of the traffic data by the pre-trained support vector machine model, wherein the data type comprises normal traffic or malicious traffic.

3. The blockchain-based host security monitoring method according to claim 2, wherein the performing the feature extraction on the traffic data to obtain the traffic feature of the traffic data comprises:
obtaining application layer protocol traffic in the traffic data and performing feature extraction on the application layer protocol traffic to obtain a protocol traffic feature of the application layer protocol traffic;
in response that a file object exists in the application layer protocol traffic, performing feature extraction on the file object to obtain a file object feature of the file object;
operating the file object in a sandbox of the host and determining a file operation feature related to the host according to an operation result; and
determining a traffic feature of the traffic data according to the protocol traffic feature, the file object feature and the file operation feature.

4. The blockchain-based host security monitoring method according to claim 1, wherein the obtaining the security state information of the host comprises:
obtaining operation state data of the host; and
determining the security state information of the host according to the operation state data and the malicious traffic.

5. The blockchain-based host security monitoring method according to claim 4, wherein the determining the security state information of the host according to the operation state data and the malicious traffic comprises:
performing feature extraction on the operation state data to obtain a state feature of the host;
determining a traffic feature corresponding to the malicious traffic; and
inputting the state feature and the traffic feature into a pre-trained random forest model to obtain the security state information of the host.

6. The blockchain-based host security monitoring method according to claim 1, wherein the saving the invasion log and the security state information into the log storage blockchain comprises:
saving a network address of the host, the intrusion log and the security state information into a block body of a current log storage block to be consensus authenticated;
in response that a block generation condition is met, obtaining block header data of a previous log storage block in the log storage blockchain and obtaining a parent block hash value by calculation according to the block header data;

calculating a block body hash value of the current log storage block according to data saved in the block body of the current log storage block;

saving the parent block hash value, the block body hash value and a timestamp of a current time into a block header of the current log storage block; and broadcasting the current log storage block to a log storage blockchain network to perform consensus authentication on the current log storage block, and linking the current log storage block onto the log storage blockchain upon a successful authentication.

7. A non-transitory computer-readable medium, having a computer program stored thereon, wherein the computer program is configured, when executed by a processor, to perform a blockchain-based host security monitoring method, comprising:

monitoring traffic data of a host in a network communication and determining whether the traffic data is malicious traffic;

in response the determining that the traffic data is the malicious traffic, obtaining security state information of the host and saving the security state information into a security state blockchain; and generating an invasion log corresponding to the malicious traffic and saving the invasion log and the security state information into a log storage blockchain, wherein the saving the security state information into the security state blockchain comprises:

saving a network address of the host and the security state information into a block body of a current security state block to be consensus authenticated;

in response that a block generation condition is met, obtaining block header data of a previous security state block in the security state blockchain, and obtaining a parent block hash value by calculation according to the block header data;

calculating a block body hash value of the current security state block according to data saved in the block body of the current block;

saving the parent block hash value, the block body hash value and a timestamp of a current time into a block header of the current security state block; and broadcasting the current security state block to a security state blockchain network to perform consensus authentication on the current security state block, and linking the current security state block onto the security state blockchain upon a successful authentication.

8. An electronic device, comprising:
a processor;
a memory, configured to store executable instructions executable by the processor, wherein
the processor is configured to perform a blockchain-based host security monitoring method by executing the executable instructions, the blockchain-based host security monitoring method comprising:
monitoring traffic data of a host in a network communication and determining whether the traffic data is malicious traffic;
in response the determining that the traffic data is the malicious traffic, obtaining security state information of the host and saving the security state information into a security state blockchain; and generating an invasion log corresponding to the malicious traffic and saving the invasion log and the security state information into a log storage blockchain, wherein the saving the security state information into the security state blockchain comprises:

saving a network address of the host and the security state information into a block body of a current security state block to be consensus authenticated;

in response that a block generation condition is met, obtaining block header data of a previous security state block in the security state blockchain, and obtaining a parent block hash value by calculation according to the block header data;

calculating a block body hash value of the current security state block according to data saved in the block body of the current block;

saving the parent block hash value, the block body hash value and a timestamp of a current time into a block header of the current security state block; and broadcasting the current security state block to a security state blockchain network to perform consensus authentication on the current security state block, and linking the current security state block onto the security state blockchain upon a successful authentication.

9. The electronic device according to claim 8, wherein the determining whether the traffic data is the malicious traffic comprises:

performing feature extraction on the traffic data to obtain a traffic feature of the traffic data;

inputting the traffic feature into a pre-trained support vector machine model to identify a data type of the traffic data by the pre-trained support vector machine model, wherein the data type comprises normal traffic or malicious traffic.

10. The electronic device according to claim 9, wherein the performing the feature extraction on the traffic data to obtain the traffic feature of the traffic data comprises:

obtaining application layer protocol traffic in the traffic data and performing feature extraction on the application layer protocol traffic to obtain a protocol traffic feature of the application layer protocol traffic;

in response that a file object exists in the application layer protocol traffic, performing feature extraction on the file object to obtain a file object feature of the file object;

operating the file object in a sandbox of the host and determining a file operation feature related to the host according to an operation result; and determining a traffic feature of the traffic data according to the protocol traffic feature, the file object feature and the file operation feature.

11. The electronic device according to claim 8, wherein the obtaining the security state information of the host comprises:

obtaining operation state data of the host; and
determining the security state information of the host according to the operation state data and the malicious traffic.

12. The electronic device according to claim 11, wherein the determining the security state information of the host according to the operation state data and the malicious traffic comprises:

performing feature extraction on the operation state data to obtain a state feature of the host;

determining a traffic feature corresponding to the malicious traffic; and inputting the state feature and the traffic feature into a pre-trained random forest model to obtain the security state information of the host.

13. The electronic device according to claim 8, wherein the saving the invasion log and the security state information into the log storage blockchain comprises:
saving a network address of the host, the intrusion log and the security state information into a block body of a current log storage block to be consensus authenticated;
in response that a block generation condition is met, obtaining block header data of a previous log storage block in the log storage blockchain and obtaining a parent block hash value by calculation according to the block header data;
calculating a block body hash value of the current log storage block according to data saved in the block body of the current log storage block;
saving the parent block hash value, the block body hash value and a timestamp of a current time into a block header of the current log storage block; and
broadcasting the current log storage block to a log storage blockchain network to perform consensus authentication on the current log storage block, and linking the current log storage block onto the log storage blockchain upon a successful authentication.

* * * * *